United States Patent [19]

Bernard et al.

[11] Patent Number: 4,869,092

[45] Date of Patent: Sep. 26, 1989

[54] DEVICE FOR CALIBRATING ULTRA-SENSITIVE ACCELEROMETERS

[75] Inventors: Alain Bernard, Fresnes; Pierre Touboul, Guyancourt, both of France

[73] Assignee: Office National d'Etudes et de Recherches Aerospatiales, Chatillon, France

[21] Appl. No.: 135,091

[22] Filed: Dec. 18, 1987

[30] Foreign Application Priority Data

Dec. 18, 1986 [FR] France .................................. 86 17718

[51] Int. Cl.$^4$ ............................................. G01P 21/00
[52] U.S. Cl. ........................................ 73/1 D; 73/1 R
[58] Field of Search ............... 73/1 D, 1 R, 1 E, 510, 73/511, 512, 2, 517 R, 517 AV, 517 B, 517 A

[56] References Cited

U.S. PATENT DOCUMENTS 3,344,673 10/1967 Laming ............................. 73/1 D X
4,393,710 7/1983 Bernard ........................... 318/662 X

OTHER PUBLICATIONS

Delattre, Michel et al, "Le Essais en Orbite de l'Accelerometre Cactus", Office National d'Etudes et de Recherches Aerospace, Publication No. 1976-5, 1977, pp. 1-9.

Advisory Group for Aerospace Research and Development, "Advances in Inertial Navigation Systems and Components", AGARDograph No. 254, Apr. 1981, pp. 5-1 to 5-10; Alain Bernard et al (The Cactus Accelerometer).

Primary Examiner—Tom Noland
Attorney, Agent, or Firm—Lowe, Price, LeBlanc, Becker, & Shur

[57] ABSTRACT

Measuring instruments, such as ultra-sensitive accelerometers, are attached to a support inlcuding three pairs of electrodynamic or piezoelectric actuators. Each actuator pair is associated with one respective common axis of a reference trirectangular system. An electronic speed and phase slaver chains the actuators to induce translational and rotational accelerations in the support. Electrical signals delivered from the instruments to be calibrated are analyzed by synchronous demodulations and processed to determine sensitivity, orientation and position of the instruments in relation to the reference axes. The instrument support can be carried on-board a satellite.

15 Claims, 5 Drawing Sheets

U.S. Patent  Sep. 26, 1989  Sheet 1 of 5  4,869,092
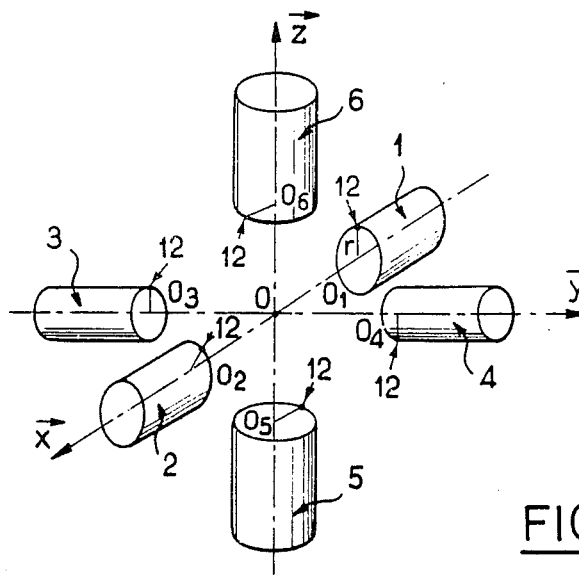
FIG_1
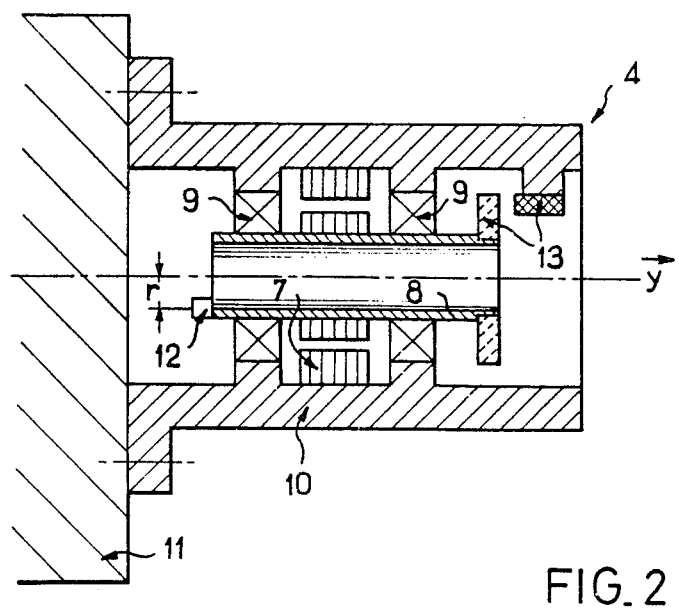
FIG_2

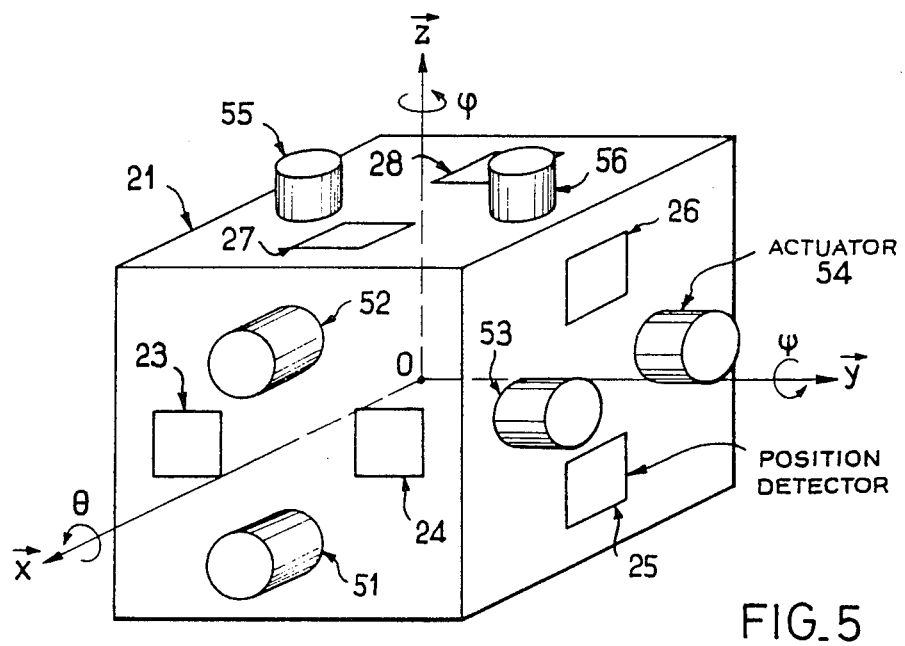
FIG_5
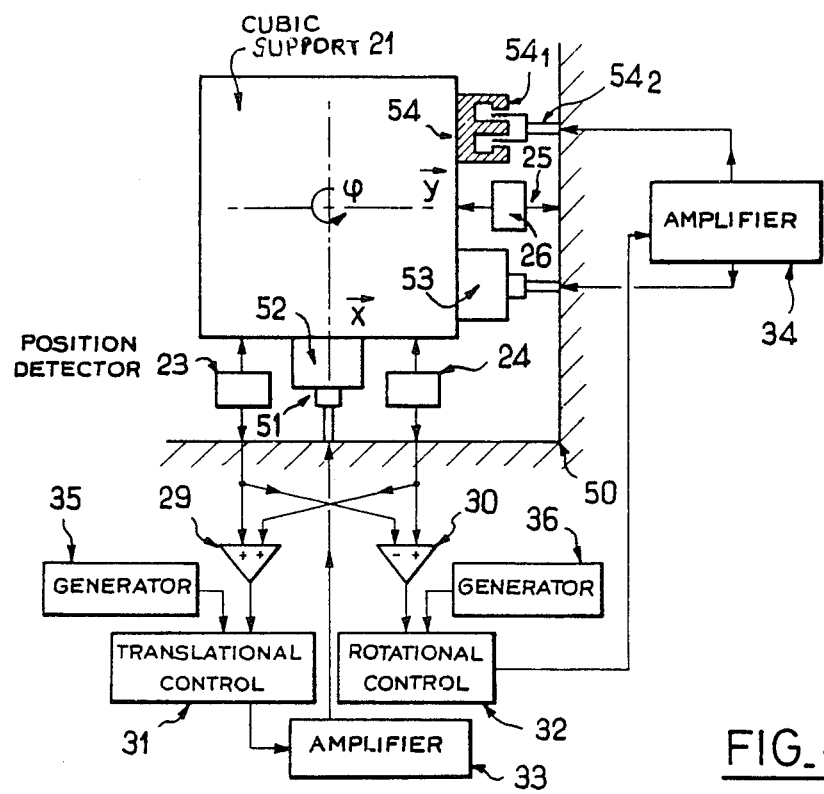
FIG_6

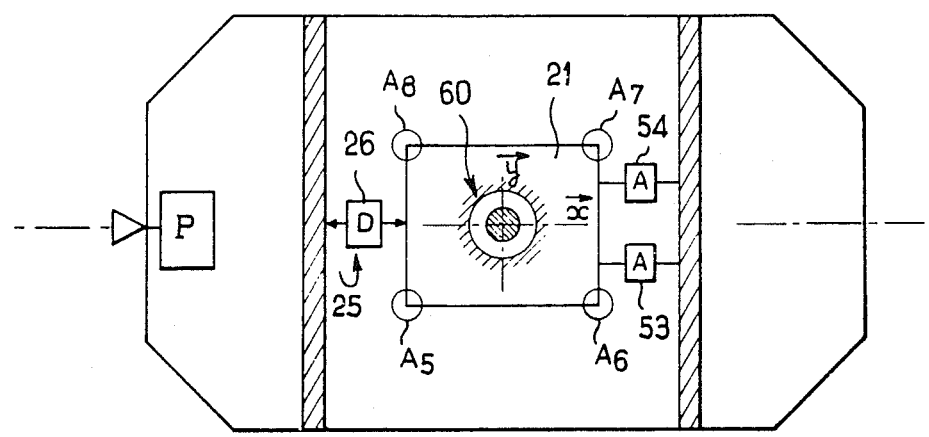
FIG_7
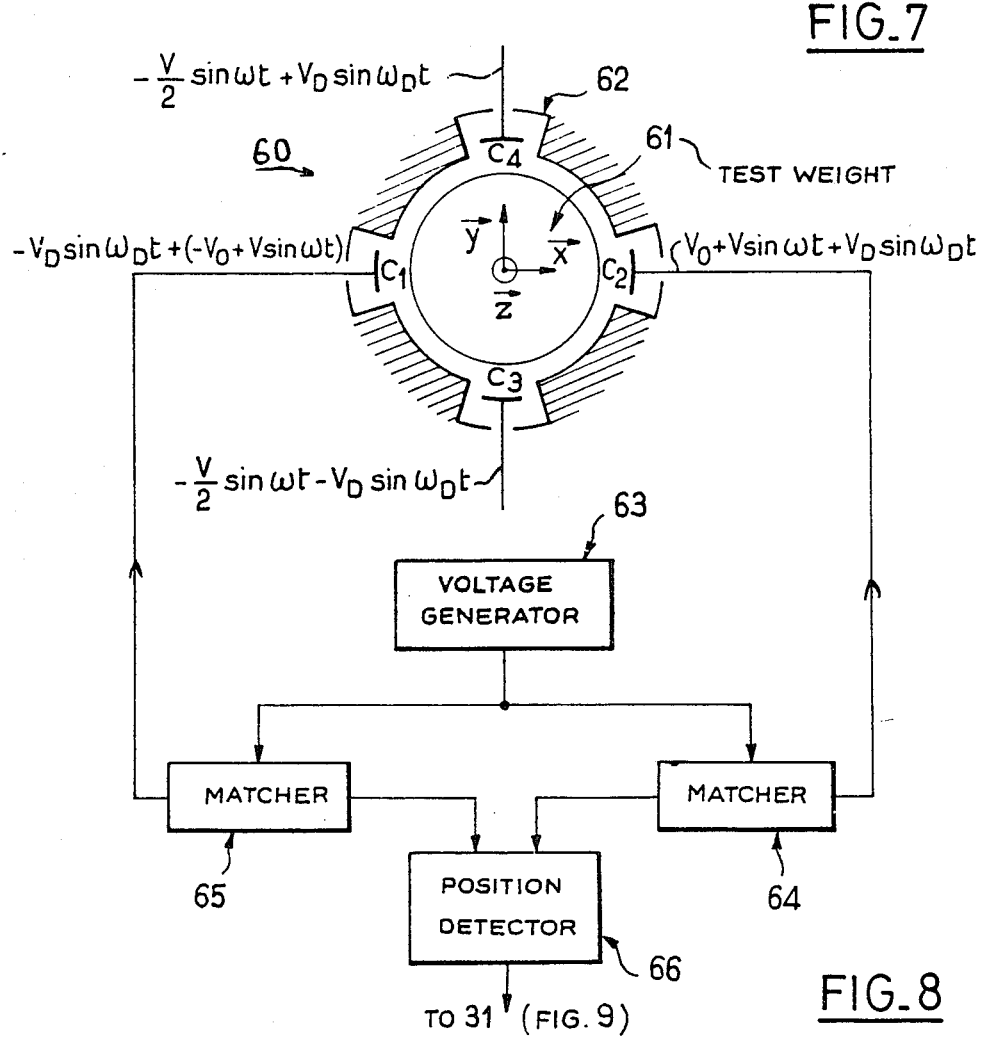
FIG_8

DEVICE FOR CALIBRATING ULTRA-SENSITIVE ACCELEROMETERS

BACKGROUND OF THE INVENTION

1. Field of the invention

This invention relates to a device designed to characterize the sensitivity to acceleration of measuring instruments such as accelerometers, rate gyros or gravimeters. It more particularly concerns the calibration of such instruments when they are rigidly mounted on the structure of a space vehicle or located on a platform decoupled from the structure, or when they are located on a platform decoupled from a ground-based support frame.

2. Description of the Prior Art

Means used on board the French CASTOR-D5B satellite to characterize the ultra-sensitive "CACTUS" triaxial electrostatic accelerometer are already known through ONERA publication No. 1976-5, "LES ESSAIS EN ORBITE DE L'ACCELEROMETRE CACTUS" (orbital testing of the CACTUS accelerometer), DELATTRE and al., and by the article entitled "The CACTUS ACCELEROMETER" which appeared in AGARDograph No. 254, Advances in Inertial Navigation Systems and Components, April 1981, pages 5-1 to 5-10.

In these documents, the accelerometer is placed in the center of mass of the satellite. Mechanisms move weights to off-center the satellite by known amounts. Flywheels control the constant speed rotation of the satellite in order to create a centripetal acceleration, within the axis system of the accelerometer, perceived as an acceleration with constant modulus and direction.

A first drawback of this technique is to impose a slow rotation on the satellite, which is not possible when the satellite needs to be stabilized in attitude and/or carries instruments pointed in one direction in space. A second drawback of the known process is that the calibration acceleration is difficult to distinguish from accelerations communicated to the satellite by external forces such as aerodynamic drag, radiation pressure, etc. Consequently the characterization precision of the accelerometer is limited, typically a relative precision of $10^{31}\ 2$, and means described are not applicable when greater precision is required.

OBJECTS OF THE INVENTION

The main object of this invention is to remedy the drawback of the above mentioned technique. The invention aims to apply to the support of the measuring instruments, along defined axes, periodic accelerations with a nil average value and known amplitude, frequency and phase, which can be easily identified using electrical signals delivered by the instruments to be characterized in response to the accelerations applied.

In practice, the periodic accelerations are sinusoidal and applied along three reference axes forming a trirectangular trihedral, in both translation and rotation, and the instrument responses are identified by synchronous demodulations of the electrical signals.

Another object of this invention is to provide a device for calibrating measuring instruments sensitive to accelerations, comprising means for generating translational and rotational accelerations along three trirectangular axes and used to determine their sensitivity, their orientation and their position in relation to the reference axes, on the basis of electrical signals.

Another object of this invention is also to identify the main shortcomings in the acceleration generating means and to determine the centering of the space vehicle or platform in relation to the reference axes, as well as the ratios of the main movements of inertia.

SUMMARY OF THE INVENTION

Accordingly, there is provided a device for calibrating acceleration-sensitive measuring instruments, wherein the instruments are attached to a support and deliver electrical signals in response to acceleration actions. The device comprises three pairs of actuators respectively associated to three reference axes forming a trirectangular trihedral for applying accelerations to the instrument support along the three reference axes. Each of the actuator pairs induces periodic translational and rotational accelerations.

In a first embodiment of the invention, the actuators in each of the pairs operate with rotative motion and dynamic unbalanced weight and are laid out symmetrically on either side of a point where the reference axes intersect. The actuators are electric motors attached to the instrument support. Each pair of the actuators has a common axis of rotation coaxial with the respective reference axis. Each of the actuators comprises an unbalanced weight which is rotated, and a phase detector for the rotation of the unbalanced weight.

In a second embodiment, the actuators operate with a linear motion and are laid out on the same side of the point where the reference axes intersect. The actuators are electrodynamic or piezoelectric motors that are placed between the instrument support and a rigid frame. Each pair of actuators is symmetrically laid out in relation to the respective reference axis and acts in a plane containing respective one of the faces of said trihedral. The calibrating device further comprises three pairs of position detectors for detecting the position of the support in relation to the reference axes. The three detector pairs are close to trihedral faces parallel to the faces relating to the three actuator pairs respectively.

BRIEF DESCRIPTION OF THE DRAWING

The foregoing and other objects, features and advantages of the invention will be apparent from the following detailed description of several preferred embodiments of the invention with reference to the corresponding accompanying drawings in which:

FIG. 1 depicts schematically a tridimensional calibration device embodying the invention and comprising three parts of dynamic unbalance actuators;

FIG. 2 depicts in detail an actuator with rotative movement and dynamic unbalance, included in the calibration device of FIG. 1;

FIG. 5 depicts schematically another embodiment of the tridimensional calibration device embodying to the invention and comprising three pairs of electrodynamic actuators and three pairs of position detectors;

FIG. 6 is a block diagram of a slaving chain with respect to a plane of the position of the support of the instruments to be calibrated for the device as shown in FIG. 5;

FIG. 7 is a schematic plane view of a calibration device analogous to that described in FIGS. 5 and 6, as installed on-board a satellite with compensated drag;

FIG. 8 is a schematic plane view of a compensated-drag detector applied to the invention.

DESCRIPTION OF THE PREFERRED EMBODIMENTS

Figure 3:
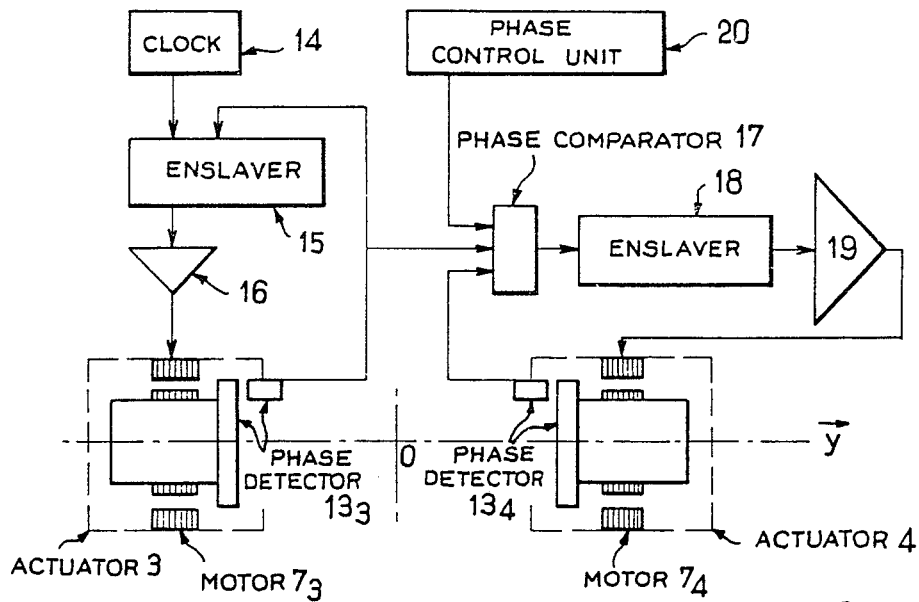
FIG. 3 is a block diagram of an electronic speed and phase slaving chain for a pair of actuators aligned along a common axis of trirectangular reference system.

With reference to FIGS. 1 and 2, the couples of reference 1-2, 3-4 and 5-6 denote three pairs of rotative actuators in a calibration device, each having an electric motor 7. The axes of rotation of the two actuators of each pair 1-2, 3-4, 5-6 are coaxial with a respective common axis $\vec{x}$, $\vec{y}$, $\vec{z}$ of the trirectangular reference frame. The motors of each pair are laid out symmetrically on either side of the intersection point 0 of the three axes. Each of the electric motors 7 comprises a rotor 8 that is dynamically balanced, and also a stator 10 in which the rotor 8 is rotatably mounted by means of ball bearings 9. The stator 10 is equipped with an attachment base 11. One of the ends of the rotor axis, facing the base, carries a small unbalanced weight 12 of mass m, off-centered in relation to the respective rotation axis $\vec{x}$, $\vec{y}$, $\vec{z}$ by distance r. The other end of rotor 8 carries the moving portion of an angular or phase detector 13.

In operation, the weight 12 is rotated at uniform speed by motor 7, and the position of weight 12 is indicated by phase detector 13. The movement of weight 12 induces on the space vehicle such as a satellite, or the platform carrying instruments to be calibrated, a translational acceleration whose amplitude is constant an whose direction turns at uniform speed in a plane perpendicular to the axis of rotation of the motor.

If the rotation plane of weight 12 does not contain the center of mass of the space vehicle, or the instruments carrying platform, the uniform motion of the weight also induces an angular acceleration whose amplitude is constant and whose direction turns uniformly in a plane perpendicular to the axis of rotation.

It can then be seen that with a group of three pairs of actuators of this type associated with three trirectangular axes, it is possible, depending on the axis, to control the rotation of the actuators to induce sinusoidal translation accelerations and sinusoidal angular accelerations, whose pulses are then equal to the angular speeds of rotation of the unbalanced weights.

For example, a single actuator with an unbalanced weight of mass m=10 g, turning at distance r of 1 cm from its axis of rotation, at an angular speed of 1 rad/s, applies to a satellite of mass $M=10^3$ kg a sinusoidal acceleration of maximum amplitude $10^{31}$ 7 m/s$^2$ and pulsation or angular frequency 1 rad/s. If the plane of rotation of weight m is a distance of 1 m from the mass center of the satellite whose main moments of inertia are $10^3$ kg.m$^2$, angular acceleration amplitude induced is $10^{31}$ 7 rad/s$^2$.

When the unbalanced weights on two actuators coaxial to the same axis, such as actuators 1 and 2 with respect to the axis $\vec{x}$ for example, turn at the same angular speed, in the same direction and with the same phase, in planes symmetrical in relation to the mass center of the satellite, the resultant of the two movements only induces on the satellite a translational acceleration parallel to axis $\vec{z}$, without angular acceleration. In the same conditions, if the unbalanced weights are in phase opposition, they induce an angular acceleration on the satellite without translational acceleration. When the unbalanced weights turn at a same speed, in opposite directions, the resultant movement induces a translational acceleration and an angular acceleration on the satellite.

When the device embodying the invention is carried on-board a satellite, the satellite attitude control system can be used to cancel out the angular speeds which would result from variations in the kinetic moment created when the actuators are started up or change operating modes.

Synchronous demodulation of the electric signals delivered from the measuring instruments can be used to determine the sensitivity of the instruments to translational and angular accelerations, these latter being dependent on the position of the instruments. Consequently, those of ordinary skill in the art can also determine the position of the instruments to be calibrated on-board the satellite or the platform.

In addition, those skilled in the art may use the information supplied by synchronous demodulations to determine shortcomings in the manufacture of the mechanisms themselves.

According to FIG. 3, two coaxial actuators, such as actuators 3 and 4 associated with common axis $\vec{y}$, each possess a motor $7_3$, $7_4$, which is speed and phase slaved by a speed and phase slaving chain. In this chain, signals outgoing from phase detector $13_3$ and a clock 14 are used to control motor $7_3$ via an electronic slaving unit 15 and an amplifier 16. Motor $7_3$ is thus slaved so that the actuator 3 operates at constant speed, the phase of the actuator 3 being referenced in relation to the clock signal.

Motor $7_4$ is slaved so that the movement of actuator 4 repeats that of actuator 3.

To do this, a phase comparator 17 analyzes signals provided by detectors $13_3$ and $13_4$ in actuators 3 and 4. A second electronic slaving unit 18 derives a signal, amplified by an amplifier 19, so that the phase difference between the movement of the two actuators is constant. An electronic control unit 20, via phase comparator 17, imposes the value of this difference.

The invention uses an inherent feature of the rotating actuators according to the invention, which is to induce, along two orthogonal axes, sinusoidal accelerations of identical maximum amplitude and at the same frequency. It is thus possible to compare the sensitivity of an instrument along two orthogonal axes with very great accuracy, since the calibration accelerations have the same acceleration source.

In a calibration device comprising three pairs of actuators as shown in FIG. 1, when the center of symmetry 0 of the device is the same as the center of mass of the satellite, it is then possible, with the help of three pairs of actuators turning at different speeds, to apply to the instrument support sinusoidal translational accelerations with three different pulsations or angular speeds according to the three axes of rotation and thus, for each axis, to obtain electrical signals from the instruments corresponding to the two translation accelerations at two different frequencies.

This is done when the unbalanced weights turn two by two at the same rotational speed with the same phase.

If the calibration device is carried on-board a satellite, speeds will be chosen which enable accelerations to be applied to the instrument support at frequencies which are sufficiently distant from that of the satellite control system to avoid interferences.

Figure 4:
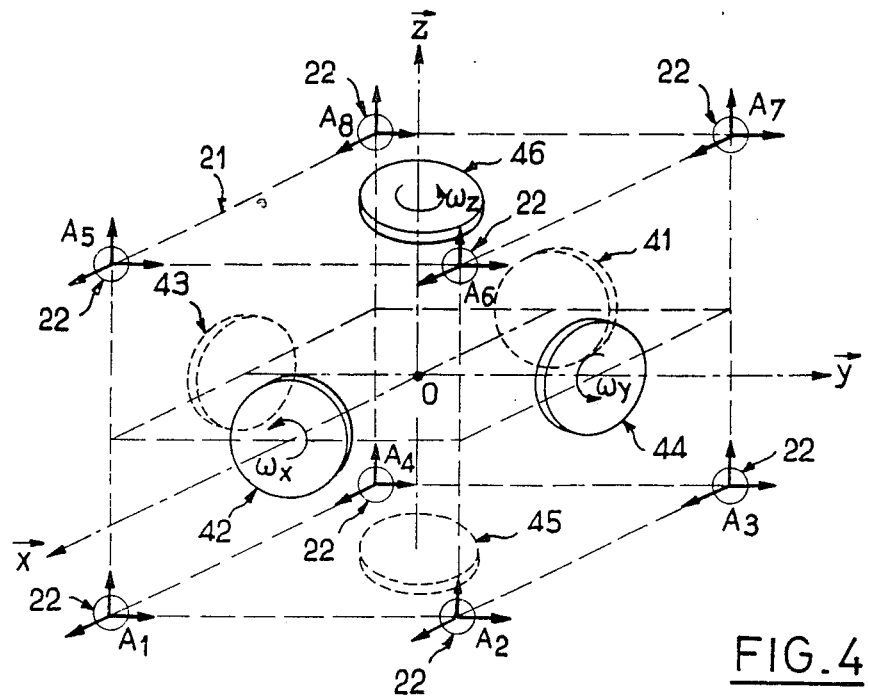
FIG. 4 depicts a diagram relating to an application of the invention to calibration of a group of accelerometers for complete identification of their characteristics.

FIG. 4 depicts an embodiment of the invention for calibration of eight triaxial accelerometers $A_1$ to $A_8$ carried on-board a satellite. The calibration device comprises a cubic support 21 which is joined to the satellite structure, and three pairs of rotative actuators 41-42, 43-44, 45-46, as shown in FIG. 2, are respectively laid out along trirectangular axes $\vec{x}$, $\vec{y}$, $\vec{z}$ passing through the centers of the faces of the cubic support.

The instruments to be calibrated are ultra-sensitive capacitive accelerometers 22 placed at the corners of cubic support 21.

The pairs of actuators 41-42, 43-44 and 45-46 are controlled by three respective electronic slaving chains as shown in FIG. 3, to obtain respective angular speeds $w_x$, $w_y$ and $w_z$, determined so as to be able to perform synchronous demodulations of the signals delivered from the accelerometers, at pulsations $w_x$, $w_y$ and $w_z$.

In another embodiment of the invention, as shown in FIGS. 5 and 6, cubic support 21 of the instruments to be calibrated comprises three pairs of linear actuators 51-52, 53-54 and 55-56 joined to a rigid frame 50. The actuators may have either an electrodynamic or piezoelectric motor. FIG. 6 shows, with a top view of the cubic support 21, an electrodynamic version of actuators, such as actuator 54 whose magnetic circuit $54_1$ is attached to support 21, and whose coil $54_2$ is attached to frame 50. The actuators are laid out so as to induce periodic translational and rotational accelerations along trirectangular axes $\vec{x}$, $\vec{y}$, $\vec{z}$.

To this end, the three pairs of actuators are respectively located on three adjacent faces of cubic support 21, and orientated symmetrically in relation to respective common axes $\vec{x}$, $\vec{y}$, and $\vec{z}$ of the reference axis system, and they act in planes containing one faces of the trihedral formed by the three trirectangular axes respectively. FIG. 5 shows three pairs of position detectors 23-24, 25-26 and 27-28 located close to the pairs of actuators 51-52, 53-54 and 55-56 respectively.

For example, outputs of detectors 23-24 are connected to inputs of amplifiers 29 and 30 operating as an adder and a subtractor. Amplifiers 29 and 30 derive respectively the sum and the difference of the signals which are delivered from the position detectors and which correspond to a translation along the $\vec{x}$ axis and a rotation $\phi$ about the $\vec{z}$ axis. Control circuits 31 and 32 are connected to outputs of amplifiers 29 and 30 and control translational actuators 51 and 52 and rotational actuators 53 and 54 via amplifiers 33 and 34 respectively. Voltage generators 35 and 36 are connected to other inputs of translational control circuit 31 and rotational control circuit 32 respectively, and constitute a periodic signal generator which imposes periodic translation and rotational calibration accelerations on the support 21 of the measuring instruments.

The group of three pairs of actuators, position detectors and electronic slaving chains ensure the control of the six degrees of freedom of the measuring instrument support in relation to frame 50, for example, such as the structure of a satellite, and allow the necessary calibration accelerations to be induced from periodic signals supplied by voltage generators 35, 36 acting on the slaving loop.

The embodiment just described is suitable for installation on-board the satellite, the voltage generators then being remote controlled, or triggered by an order which is part of an on-board program.

A preferred embodiment of the invention consists in using electrodynamic motors actuators and taking advantage of the presence on-board a "compensated-drag" type satellite of a drag compensation detection system to induce the necessary calibration accelerations on the measuring instrument support.

It is recalled that a compensated-drag satellite is a satellite in low earth orbit, generally less than 300 km, which is subjected to surface forces due to aerodynamic drag (braking by the residual atmosphere) and which must be kept in orbit by controlled propulsion phases in order to compensate this drag.

The satellite thus contains a test weight, also called as a proof mass, for example spherical, having an orbital movement and free to move in relation to the satellite, and detectors for detecting the position of the test weight in relation to the satellite. In view of the satellite braking mentioned above, the test weight, which is not subject to the external forces on the satellite, tends to move in the opposite direction to the drag.

A control law can be used to determine the speed thrusts to be exerted on the satellite by an appropriate propulsion system, as a function of the relative displacement observed by the position detectors, in order to maintain the test weight within an acceptable position range. The satellite is thus slaved in position with respect to the test weight, with an accuracy corresponding to the range chosen.

In these conditions, the accelerometers mounted on their support are, during the propulsion phases, subjected to accelerations caused by the speed thrusts communicated to the satellite by the propulsion system.

The invention recommends placing a drag compensation detector 60 in the center 0 of the instrument cubic support 21. The support 21 comprises three pairs of electrodynamic actuators and three pairs of position detectors respectively associated with the three reference axes, such as the actuator pair 53-54 and the position detector pair 25-26 schematically shown in FIG. 7 and associated with the axis $\vec{x}$.

A two-stage system is then constituted by:

on the one hand, the instrument support slaved in position with respect to the test weight of the drag compensation detector with a high degree of accuracy and, on the other hand, the satellite is slaved in position with respect to the instrument support with a limited degree of accuracy, which has the advantage of isolating the instruments to be calibrated from the accelerations due to external forces.

It is then sufficient to apply the calibration accelerations to the test weight for them to be applied to the support on which the instruments to be calibrated are mounted, since this is slaved so as to repeat the movements of the test weight.

An electrical action on the test weight imposes modifications of its orbital displacement, and the electrical signals representative of its displacement are used to control directly the electrodynamic actuator slaving loop, as will be described hereinafter with reference to FIGS. 8 and 9.

In FIG. 8, 60 denotes a drag compensation detector comprising a spherical test weight 61 inside a spherical cage 62. The test weight is free and floats in the cage.

Spherical cap electrodes $C_1$-$C_2$, $C_3$-$C_4$ and $C_5$-$C_6$ are isolated from the cage and are laid out in pairs around poles where three respective trirectangular axes $\vec{x}$, $\vec{y}$, $\vec{z}$, whose origin is the center of the cage, meet the cage.

The two electrodes centered on a same respective axis $\vec{x}$, $\vec{y}$, $\vec{z}$ are used for capacitive detention of the position of weight 61 and for generation of the calibration accelerations.

To do this, electrodes $C_1$ and $C_2$ of the $\vec{x}$ axis receive phase opposition detection voltages ($-V_D \sin \omega_D t$) and ($V_D \sin \omega_D t$) from a voltage generator 63 via impedance and voltage matchers 64 and 65.

During the calibration phases and via the same channels, electrodes $C_1$ and $C_2$ also receive calibration acceleration generation voltages ($-V_0 + V \sin \omega t$) and ($V_0 + V \sin \omega t$). The detection voltage pulsation $\omega_D$ is preferably high, typically more than $3 \times 10^5$ rad/s, whereas that pulsation $\omega$ corresponding to the generation of calibration accelerations is low and does not disturb the operation of the capactive detector.

The other four electrodes $C_3$-$C_4$ and $C_5$-$C_6$ associated with the other two axes perpendicular to the force to be induced, along $\vec{x}$ in FIG. 8, are powered by detection voltages respectively opposed ($-V_D \sin \omega_D t$) and ($V_D \sin \omega_D t$) and, throughout the calibration phase, by sinusoidal voltages ($-(V/2) \sin \omega t$) having half amplitudes and opposed phases to that applied to electrodes $C_1$ and $C_2$, as shown in FIG. 8, and supplied by generator 63 from a common reference frequency source, not shown.

Apart from the application of the calibration voltages, the device operates as a compensated drag detector.

Figure 9:
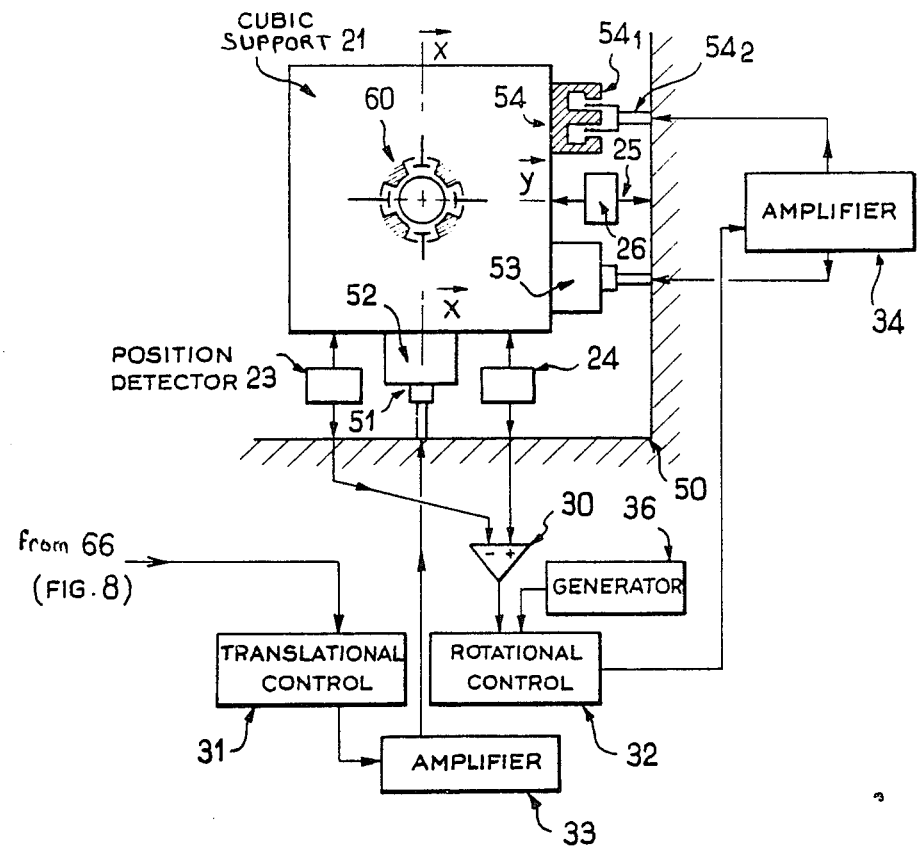
FIG. 9 is a block diagram of the slaving chain for the position of the support of the instruments to be calibrated in the case of a satellite including a drag compensating detector.

The relative position of the test weight 61 in relation to electrodes $C_1$-$C_2$ is measured by position detector 66 having inputs connected to matchers 64 and 65 and an output connected to translational control circuit 31 shown in FIG. 9.

The calibration device according to the invention as shown in FIG. 9 is similar to that in FIG. 6 previously described, except for the fact that it now comprises the drag compensation detector 60 and that the position detector 66 is connected to translational control circuit 31. The output voltages of position detector 66 act on the translational slaving loop of support 21 with respect to the test weight. In this way, all the faults in the components, such as faults in the electrodynamic motors, whose efficiency could for example be poorly defined, which limit the calibration accuracy, no longer have any importance, provided that the loop gain is sufficient.

In the recommended embodiment, with correctly realized slaving, the calibration accuracy on the instruments to be calibrated now only depends on the quality of generation of the electrostatic forces induced on the test weight 61 in the drag compensation detector 60, independently of the shortcomings of the rest of the system.

As is known with the operation of electrostatic accelerometers, it is important that the potential of the test weight be kept equal to that of the cage.

If this condition is met, the electrostatic forces obtained at pulsation $\omega$ are nil on the $\vec{y}$ and $\vec{z}$ axes.

$$F_y = F_z \approx (\epsilon S/(2e^2))[((-V/2) \sin \omega t)^2 - (-(V/2) \sin \omega t)^2]$$

where $\epsilon$ denotes permittivity of vacuum, S the surface of one electrode, and e the distance between electrode and test weight; the force induced on the $\vec{x}$ axis is:

$$F_x \approx (\epsilon S/(2e^2))[(V_0 = V \sin \omega t)^2 - (-V_0 = V \sin \omega t)^2]$$

$$F_x \approx (2\epsilon S \ V_0/e^2)V \sin \omega t$$

If the system is perfectly symmetrical, forces $F_y$ and $F_z$ do not include components with pulsation $\omega$ and also do not disturb the calibration.

Force $F_x$ is sinusoidal, with pulsation $\omega$. The amplitude of force $F_x$ is proportional to the $C_1$) and $C_2$ electrode capacitance gradients with respect to the test weight, at the biasing voltage $V_0$ and the amplitude V of the applied sinusoidal voltages.

The acceleration communicated to the test weight 61 and consequently, to the instruments to be calibrated, is therefore;

$$\Gamma_x = F_x/m$$

m being the mass of the text weight 61.

As an example of the embodiment, let us assume that test weight 61 is a ball of platinum-rhodium alloy, having 4 cm in diameter and a mass of about 600 g. The gap between the ball and the electrodes is 680 μm when the ball is in its mid-position.

To induce accelerations of about $10^{-6}$ m/s$^2$ to calibrate ultra-sensitive accelerometers in-flight, the voltages to be applied are relatively low in view of the surface of an electrode, about equal to 90 mm$^2$, and the capacitance gradient in the axis of an electrode, equal to $1.722 \times 10^{-9}$ F/m.

With $V_0$ and V equal to 15 volts, we obtain an acceleration as follows:

$$\Gamma = [2 \ \epsilon S/e^2](V_0 V/m) \sin \omega t$$

$$\Gamma = 2 \times 1.722 \times 10^{-9} \times (225/(600 \times 10^{-3})) \sin \omega t$$

i.e., $\Gamma = 1.3 \times 10^{-6}$ m/s$^2$.

The device just described, with reference to FIGS. 8 and 9, provides for translational acceleration calibration on the three axes.

The device according to the invention can be used to detect the differences in sensitivity between the accelerometers to be calibrated, with a relative value accuracy of better than $10^{-4}$, and better than $10^{31 \ 4}$ for the directions of the sensitive axes, as well as determining their relative positions with a high degree of accuracy.

The calibration device just described in a complete triaxial embodiment can, of course, be simplified if the instruments to be calibrated only have a single axis or two sensitivity axes to be calibrated. Relating to the axes not to be calibrated, it is not necessary to provide a voltage generator 63 and impedance and voltage matchers 63 and 64.

What is claimed is:

1. A device for calibrating acceleration-sensitive measuring instruments, said instruments being attached to a support and delivering electrical signals in response to acceleration actions, said device comprising three parts of actuators respectively associated with three reference axes forming a trirectangular trihedral for applying accelerations to said instrument support along said three reference axes whereby each of said actuator pairs induces periodic translational and rotational accelerations.

2. The device claimed in claim 1, wherein said actuators of each of said pairs operate with rotative motion and a dynamic unbalanced weight and are laid out symmetrically on either side of a point where said reference axes intersect.

3. The device claimed in claim 2, wherein said actuators are electric motors attached to said instrument support, each pair of said actuators having an axis of rotation coaxial with the respective reference axis, each of said actuators comprising a rotative unbalanced weight and a phase detector for the rotation of said unbalance weight.

4. A device as claimed in claim 3 comprising means of controlling said electric motors with periodic voltages, whereby said actuators induce sinusoidal accelerations, said electrical signals delivered from said instruments to be calibrated being analyzed by synchronous demodulating means.

5. The device claimed in claim 1, wherein said actuators operate with linear motion and are laid out on the same side of a point where said reference axes intersect.

6. The device claimed in claim 5, wherein said actuators are placed between said instrument support and a rigid frame, each of said actuator parts being symmetrically laid out in relation to the respective reference axis and acting in a plane containing a respective face of said trihedral.

7. The device claimed in claim 6 wherein said actuators are electrodynamic.

8. The device claimed in claim 6 wherein said actuators are piezoelectric.

9. A device as claimed in claim 6 comprising three parts of position detectors for detecting positions of said instrument support with respect to said reference axes, said three detector pairs being respectively close to trihedral faces parallel to said faces that with which said three actuators pairs are respectively coplanar, means for generating periodic signals, and instrument support position slaving means receiving signals from said position detectors and said periodic signals for supplying electric control signals to said actuators whereby said actuators induce sinusoidal accelerations, said electric signals delivered to said instruments to be calibrated being analyzed by synchronous demodulating means.

10. The device claimed in claim 9, wherein said actuators are electrodynamic and are placed between said instrument support and a rigid frame, said device being carried on-board a compensated-drag satellite, and said support comprising a drag compensation detector with a test weight.

11. A device as claimed in claim 10 wherein said actuators are controlled to induce sinusoidal translational accelerations and are included in a support position slaving chain receiving test weight position detection signals, the displacement of said test weight being controlled by voltages delivered by a voltage generator.

12. The device claimed in claim 11, wherein said test weight in said drag compensation detector is spherical, free and floating in a cage carrying spherical cap electrodes, said electrodes being isolated from said cage and aligned in pairs along three orthogonal axes, and wherein said electrodes for each of said axes constitute both electrodes of a test weight position capacitive detector and electrostatic force application electrodes for changes of displacement of said test weight.

13. A calibration method for instruments sensitive to accelerations, said instruments being attached to a support and delivering electrical signals in response to acceleration actions, said method comprising applying periodic translational and rotational accelerations to said instrument support along three reference axes forming a trirectangular trihedral, and collecting said electrical signals delivered from said instruments to be calibrated thereby deducing the characteristics of said instruments, said periodic translational and rotational accelerations being induced by three pairs of actuators respectively associated with said three reference axes.

14. The calibration method claimed in claim 13, wherein said three actuator pairs induce three sinusoidal accelerations having distinct frequencies for said reference axes, respectively, said electric signals delivered from said instruments being analyzed by synchronous demodulations and processed to determine sensitivity, orientation and position of said instruments in relation to said reference axes.

15. A calibration method for instruments sensitive to accelerations, said instruments being attached to a support and delivering electrical signals responsive to acceleration actions, said support being carried on-board a compensated-drag satellite, said method comprising applying periodic translational accelerations to said instrument support along three reference axes forming a trirectangular trihedral, in) collecting said electrical signal delivered from said instruments to be calibrated thereby deducing characteristics of said instruments, said periodic translational accelerations being induced by three pairs of electrodynamic actuators respectively associated with said three reference axes and being respectively included in three loops for position-slaving said instrument support in relation to a test weight, said test weight being included in a drag compensation detector of said satellite, said drag compensation detector being capacitive and having three pairs of electrodes respectively associated with said three reference axes, applying two oppositely phased detection voltages to said two electrodes of each of said electrode pairs respectively, during instrument calibration phases applying calibration acceleration generation voltages to said two electrodes associated with a predetermined one of said reference axes and other voltages having half amplitudes and opposite phases to those of said calibration acceleration generation voltages, said electrical signals delivered from said measuring instruments to be calibrated being analyzed by synchronous demodulations and processed to determine sensitivity, orientation and position of said instruments in relation to said reference axes.

* * * * *